United States Patent [19]

Parker

[11] Patent Number: 4,888,880
[45] Date of Patent: Dec. 26, 1989

[54] ELECTRICIAN'S LEVEL

[76] Inventor: Michael A. Parker, 1725 Nueva Vista Dr., Denver, Colo. 80229

[21] Appl. No.: 295,266

[22] Filed: Jan. 10, 1989

[51] Int. Cl.⁴ .............................................. G01C 9/26
[52] U.S. Cl. ........................................ 33/645; 33/451;
33/528; 33/DIG. 10; 33/371
[58] Field of Search ................. 33/451, 528, 562, 613,
33/381, 379, 371, 645, DIG. 10

[56] References Cited

U.S. PATENT DOCUMENTS

| | | | |
|---|---|---|---|
| 2,540,032 | 1/1951 | Johnson et al. | 33/528 |
| 2,733,513 | 2/1956 | Gatineau | 33/DIG. 10 |
| 2,775,812 | 1/1957 | Mohr | 33/528 |
| 2,992,490 | 7/1961 | Hay et al. | 33/528 |
| 3,116,563 | 1/1964 | Gelbnau | 33/DIG. 10 |
| 3,123,918 | 3/1964 | Crabtree | 33/528 |
| 3,279,080 | 10/1966 | Stepshinski | 33/DIG. 10 |
| 4,126,944 | 11/1978 | Burkhart | 33/DIG 10 |
| 4,622,753 | 11/1986 | Jones et al. | 33/562 |

FOREIGN PATENT DOCUMENTS 2812273 9/1979 Fed. Rep. of Germany .... 33/DIG. 10

Primary Examiner—Allan N. Shoap
Assistant Examiner—Thomas B. Will
Attorney, Agent, or Firm—Edwin L. Spangler, Jr.; Richard W. Hanes

[57] ABSTRACT

An electrician's tool is disclosed which comprises a combination template and spirit level. A pair of locating pins stored in the housing carrying at least one spirit level are removable and relocatable in a pair of pin-receiving openings which are spaced from one another and from a side edge of the template the distance required to mate with and be detachably received within the grounded prong-receiving openings of a conventional dual receptacle. When so positioned, a lip on the righthand edge of the template defines a stop-forming abutment for locating a second dual socket or a toggle switch in the precise ganged relation necessary to accept an appropriately apertured trimplate. A horizontally-disposed spirit level is used to align the receptacles to toggle switches or both vertically. A second vertically-disposed spirit level may be included for aligning horizontal installations.

9 Claims, 1 Drawing Sheet

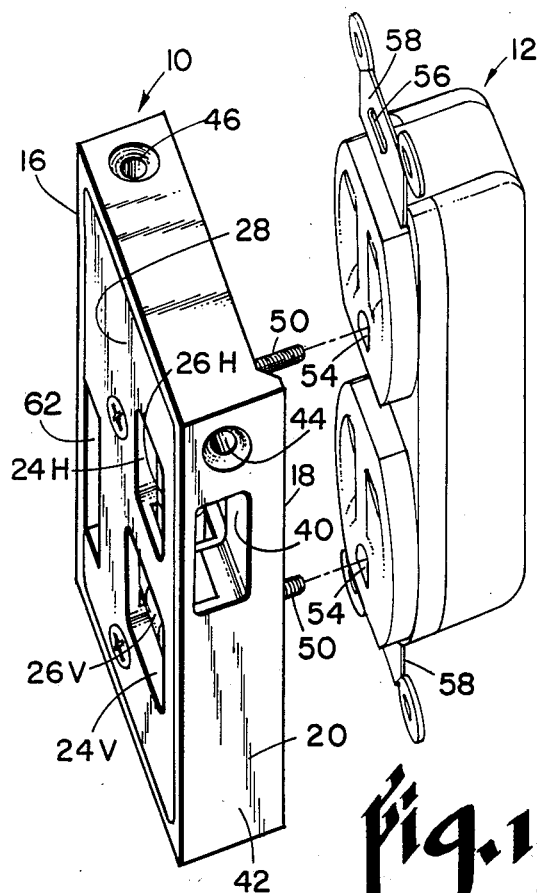
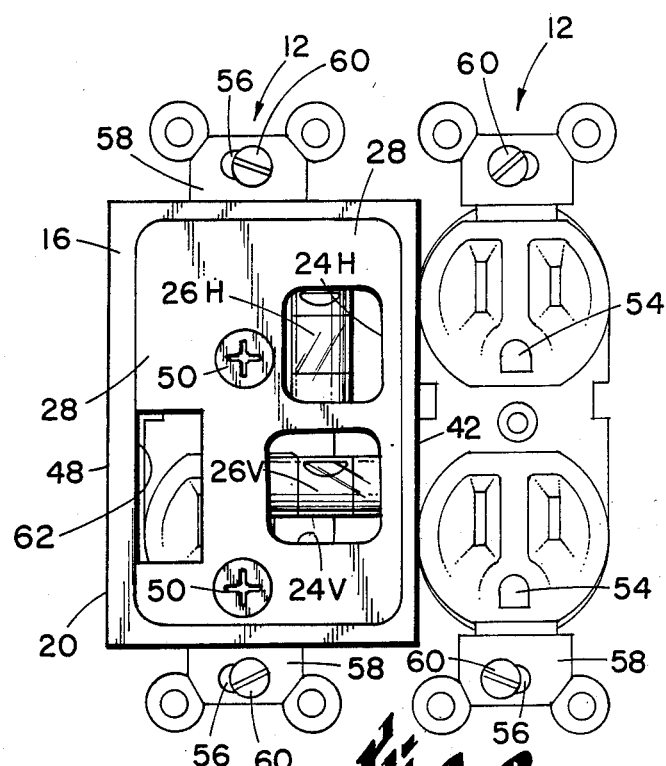
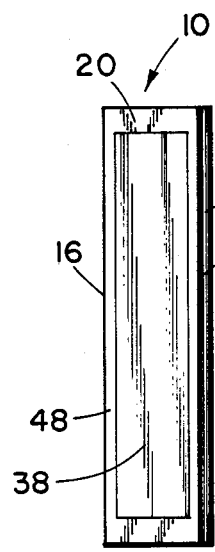
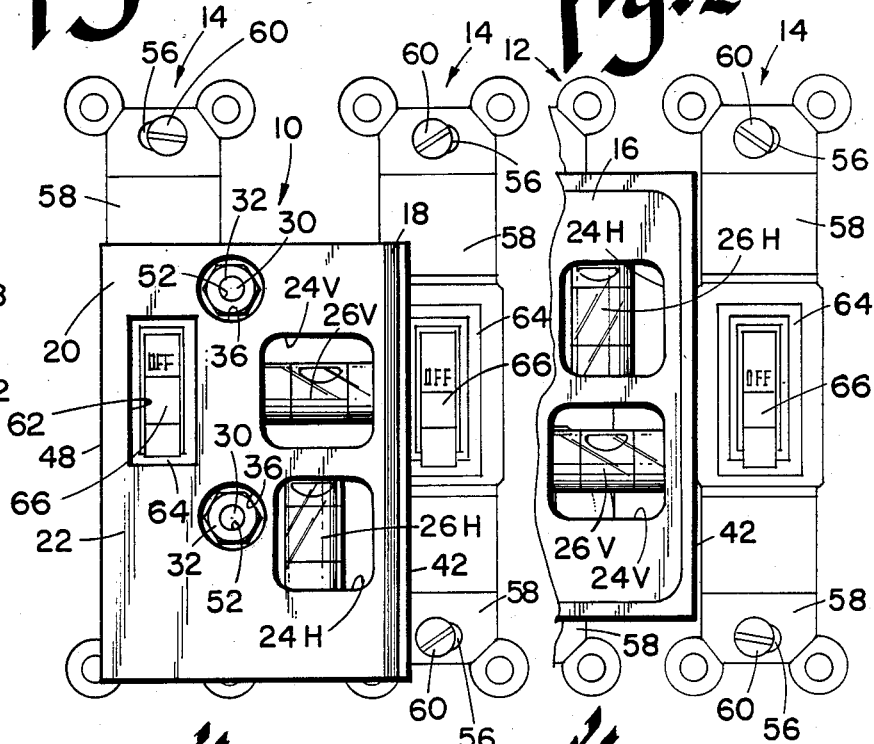
Fig. 1  Fig. 2  Fig. 5  Fig. 3  Fig. 4

ELECTRICIAN'S LEVEL

BACKGROUND OF THE INVENTION

Electrician's are more or less constantly faced with the problem of "cutting-in" metal boxes so as to not make an oversized or undersized or tilted opening, leveling them so that the switches and receptacles to be attached thereto are not skewed, arranging two or more receptacles or switches or combinations of the two in properly spaced relation to one another to receive the trimplates, and to perform other simple installations requiring everything to be square and level for aesthetic reasons s well as practical ones.

1. Field of the Invention

The present invention has to do with a combination level, template and alignment tool specifically designed for use by electrician's in the installation of outlet boxes, switches and plug-receiving outlets either alone or in ganged relation, and the trimplates therefor.

2. Description of the Related Art

U.S. Pat. Nos. 2,733,513 to Gatineau, 4,126,944 to Burkhart, and 4,622,753 to Jones et al, all disclose the broad concept of combining a spirit level with a template of some sort for cutting openings for outlet boxes or leveling switches and trimplates. While Gatineau shows how his template is to be used to double the size of the outlet box opening, neither he nor the other inventors provides for using one plug-receiving socket or toggle switch that has been installed and leveled as the means for installing a second one in properly spaced relation to receive the trimplate.

A German Patent No. 812273 also uses a template and spirit levels for aligning two or more plug-receiving outlets in side-by-side or vertically-aligned relation. It has pockets in its rear face that receive the projecting sockets and feet that engage the surrounding wall surfaces that tell whether the sockets are mounted flush or not. The template is apparently only used to check the final alignment and not to properly align and space the receptacles in the first instance.

One final group of patents need to be considered and they are the U.S. Pat. Nos. 3,116,563 to Gelbman, 3,123,918 to Crabtree, and 3,279,080 to Stepshinski, all of which disclose combination templates and spirit levels for use in installing wall switches and receptacles that incorporate some kind of physical connection between the part being installed and the template that is used during the actual installation procedure. Both Crabtree and Gelbman provide double-faced templates useful in mounting either switches or sockets; however, nothing is said about the templates being useful in ganging the elements being aligned, providing a template for making the hole in the wall that receives the outlet box, ganging dissimilar elements or performing other leveling and alignment tasks as an electrician is called upon to do.

SUMMARY OF THE INVENTION

In accordance with the teaching of the present invention, a novel and improved combination spirit level and template for use by electricians is provided in which there are no protruding pins or prongs to interfere with its being carried around in the pocket; yet, such alignment and temporary attachment pins required for socket insertion are available when needed in the form of a pair of long screws stored in the two-part housing which replace and are interchanged with the shorter screws holding the elements of the housing together. A magnet recessed in flush relation on one side of the template is used to attach it temporarily to magnetic materials such as an outlet box while the stud supporting same is aligned vertically during the erection of interior walls and the like.

A toggle-receiving-window is provided in the template positioned and adapted to receive the bezel bordering a toggle switch thus forming a wrench for rotating the latter into the vertically aligned position indicated by one of the two spirit levels while the screws fastening it to the outlet box are still loose. The aforementioned prongs perform the same function when mounting a plug receptacle in place of a toggle switch. The vertical dimension of the template is selected to leave the screws mounting the switch or receptacle to the outlet box exposed both top and bottom thus eliminating the need for registering apertures to receive a screwdriver for this purpose. Moreover, the width and height of the unit has been chosen to define a template of the proper shape and size needed to outline the opening to be cut in the wall for receiving an outlet box.

While the width of the unit is the same as that of the opening needed for insertion of an outlet box, the distance separating the locating pins from its righthand edge is specifically chosen to locate the lefthand edge of an adjacent receptacle in position such that the trimplate will fit the two in ganged relation. Also, in the case of receptacles which project forwardly from the adjacent wall surfaces and thus prevent the template from fitting flush against the latter, the righthand edge of the template carries a rib that projects inwardly and forms an abutment positioned for engagement by the adjacent receptacle. Toggle switches, on the other hand, permit the template to fit flush against the adjacent wall surfaces and the rib is not needed. This fact enables the template to be turned upside down end-for-end and the toggle-receiving window to be located relative to the righthand edge a distance selected to locate an adjacent toggle switch without the rib interfering, the distances between adjacent toggles being different than from adjacent receptacles.

Yet another feature of the template and its appurtenances is its ability to properly space and align in ganged relation combinations of switches and receptacles to receive combination trimplates. A second spirit level is used for leveling baseboard-mounted receptacles which, of course, are most often turned on their sides as opposed to being installed vertically.

It is, therefore, the principal object of the present invention to provide a novel and improved combination spirit level and template specifically designed for use by electricians.

A second objective is the provision of a device of the type aforementioned which fits into the pocket, yet carries the pin-forming projections needed for aligning and ganging receptacles.

Another object of the within-described invention is to provide a universal template sized and shaped to outline the wall openings for outlet boxes, the spacing between ganged toggle switches or plug-receiving receptacles or combinations of the two.

Still another objective of the combination unit herein disclosed and claimed is to provide the template with a rib designed for use when ganging adjacent dual receptacles which are not flush but which stick out from the wall.

An additional object is to provide a ribbed template which upon being turned end-for-end and upside down permits it to be used in flush relation to align and gang adjacent toggle switches.

Further objects are to provide an alignment and leveling tool for electricians which is simple, lightweight yet rugged, versatile, easy to use, compact, inexpensive and even quite decorative.

Other objects will be in part apparent and in part pointed out specifically hereinafter in connection with the description of the drawings that follows.

BRIEF DESCRIPTION OF THE DRAWINGS

FIG. 1 is a perspective view showing how the combination spirit level and template is used to align a plug-receiving receptacle;

FIG. 2 is a front elevation to a slightly reduced scale showing the assembly pictured in FIG. 1 being used to align and space a second plug-receiving receptacle to accept a trimplate;

FIG. 3 ia a front elevation similar to FIG. 2 and to the same scale showing the combination unit turned upside down end-for-end being used to align and space a pair of toggle switches to accept a trimplate;

FIG. 4 is a front elevation similar to FIGS. 2 and 3 and again to the same scale but with portions broken away to conserve space showing the use of the tool in positioning a toggle switch next to a receptacle; and, FIG. 5 is a left end elevation showing the magnetic insert as seen in FIG. 3 to the same scale as FIGS. 2-4.

DESCRIPTION OF THE PREFERRED EMBODIMENTS

Referring next to the drawings for a detailed description of the present invention, reference numeral 10 has been selected to broadly identify the combination electrician's level and template forming the subject matter hereof while numerals 12 and 14 similarly denote conventional double wall receptacles and toggle switches, respectively. The simplest of the many applications for which the tool is designed is that of a template for use in scribing on a wall surface or the like which outline a cutout very close to the proper size required to receive standard so-called "cut-in" metal boxes. The face 16 without the lip or flange 18 seen most clearly in FIGS. 1, 2, 4 and 5 is, of course, placed against the wall when scribing around it since it will lay flat.

With particular reference to FIGS. 1, 3 and 5, the tool 10 will be seen to include a rectangular housing 20 having a planar face 22 best seen in FIG. 3 bordered along one side margin by integrally-formed lip 18 mentioned above. One generally rectangular window 24V exposes to view a horizontally-disposed fluid-filled spirit level tube 26V while a second similarly-shaped window 24H exposes a vertically-disposed one 26H. One or the other of these levels is, of course, used in cutting in the metal boxes to insure that the cut is not askew. They also come into play in all the other applications of the tool which will be described in detail presently.

In FIG. 1 it can be seen that the face 16 opposite the one having the lip 18 is recessed about half the thickness of the housing 20 to receive insert 28 that is detachably fastened to face 22 by a pair of short screw fasteners 30 and nuts 32 (FIG. 3) which clamp these elements together in sandwiched relation and hold the spirit level tubes 26H and 26V in place. The heads of the screws are countersunk into the body of the insert to keep the face 16 of the tool planar as can best be seen in FIG. 1. Also, recesses 36 are provided in face 22 of the housing to receive the nuts as seen in FIG. 3 thus keeping this face planar also, the length of screws 30 having been selected so as to not project beyond the plane of face 22. An obvious alternative construction would be to have the housing and insert threadably interconnected by screws 30 thereby eliminating the need for the nuts 32 and the recesses 36. Insert 28 also has windows 24H and 24V registering with those in the housing thus exposing the spirit levels to view from either side as seen in FIGS. 2, 3 and 4.

Another of the simpler applications of the tool is that of a conventional spirit level and the many functions a level is useful in performing during construction, be they electrical or otherwise. These functions are enhanced by providing the tool with a magnetic insert 38 along one side margin as seen in FIG. 5 and a side-opening window 40 found in FIG. 1 which exposes the vertically-disposed spirit level 26H to view from the edge 42 of the housing carrying the lip 18. The magnetic insert is useful in attaching the tool to metal boxes, conduit, some metal panels and even metal studs provided that they contain a certain amount of ferromagnetic material.

One of the most important and unique features of the tool is that of using it to align and gang two or more toggle switches or receptacles or combinations of the two. These applications are best shown in FIGS. 1-4, inclusive, to which detailed reference will next be made. Looking first at FIG. 1, it will be seen that the housing 20 is provided with a pair of internally-threaded screw-receiving passages each having countersunk entryways, one of which 44 is shown extending along the top emerging onto side edge 42 while the other one 46 extends down along the opposite side margin 48 alongside the magnetic insert 38. These passages threadably receive a pair of screws 50 which are identical to screws 30 except that they are considerably longer and project well beyond face 22 of the housing as seen in FIG. 1. The spacing between the aligned screw-receiving openings 52 (FIG. 3) in the housing 20 and insert 28 are exactly the same as the spacing between the spaced openings 54 in a dual receptacle which receive the grounded prong or blade of a grounded three-bladed wall plug (not shown). Thus, as seen in FIG. 1, screws 50 upon being removed from their places of storage in the housing and being inserted in place of the shorter screws 30 will be in position for insertion into a dual wall receptacle thus detachably latching the two together in the assembled relation shown in FIG. 2. Screw-receiving openings 52 are, of course, vertically aligned parallel to spirit level 26H such that when level 26V indicates a level condition, the dual receptacle will be vertical. By the same token, these same openings are perpendicularly-disposed relative to the horizontal spirit level 26V for those applications in which the dual receptacle is installed horizontally using level 26H which is often the case in baseboard installations.

Now, when the tool 10 and dual receptacle 12 are assembled as shown in FIG. 2, the plug-receiving parts of the receptacle project slightly beyond the adjacent wall surfaces thus holding the tool away from the latter. A second receptacle like that shown to the right of the tool in FIG. 2 would thus not be engaged by its right-hand edge 42 of the tool were it not for the presence of inwardly-projecting rib 18 which engages the plug-receiving parts and spaces them the precise distance away from the first set to receive the trimplate (not shown). All such dual receptacles and toggle switches have slotted openings 56 in their attachment tabs 58 which permit them to tilt a few degrees to one side or the other before being fastened in place by their screws 60 thus enabling them to be leveled as indicated in this instance by horizontal spirit level 26V. In applications such as this, therefore, the combined leveling and template capabilities of the tool 10 become most evident.

Directing the attention next to FIG. 3, the use of the tool in ganging two or more toggle switches 14 will be described. Offset to one side of the two spirit level windows 24V and 24H is a third window 62 which is also shown raised above the latter window to leave enough room to store the long screw 50 that is stored in the passage 46 which extends upwardly in the orientation shown in FIG. 4 along the wall 48 of the housing spaced inwardly from the magnetic insert 38. The overall height of the tool necessary to match that of a cut-in metal box is such that raising window 62 above the horizontal centerline is desirable to accommodate the storage of long screw 50 especially since the location of this window up or down is of no significance, only its orientation relative to the sidewall 42. Toggle-switch-receiving opening 62 is sized to receive the bezel 64 surrounding the toggle 66 in the manner clearly shown in FIG. 3 and fit flush against the adjacent wall surfaces. The construction of such switches is such that they do permit the face 28 of the tool to fit flush against the wall which means that the rib 18 required as a stop for the installation of dual receptacles which stick out from the wall is not needed and, as a matter of fact, would prevent the tool from lying in the aforementioned face-to-face flush relationship. Since side margin 42 remains the one which abuts and precisely locates the adjacent toggle switch, the tool must be flopped over end-for-end from the position in which it is shown in FIG. 2 in order to bring the face 22 of the housing onto the front. Flipping the tool over from side-to-side as opposed to end-for-end will, of course, place the toggle switch window in the wrong position. With the tool located as shown in FIG. 3 where its face 22 is exposed and its side edge 42 is on the right, the latter edge abuts the bezel of a second toggle switch and forms a stop therefor which is precisely matched to the openings found in a double toggle switch trimplate (not shown). Of course, when mounting a pair of toggle switches 14 in ganged relation as shown in FIG. 3, the long screws 50 which define the locating pins of the FIG. 2 embodiment are removed and stored in their threaded passages 44 and 46 while being replaced by their shorter counterparts 30. On the other hand, when using screws 50 as locating pins as shown in FIG. 2, the shorter screws 30 are stored in the passages 44 and 46.

Finally, with reference to FIG. 4, the use of the tool 10 to precisely position a toggle switch 14 alongside a dual receptacle 12 will be explained. In this application, the tool occupies exactly the same position in which it is shown in FIG. 2 with the inwardly extending rib 18 functioning to engage and form a stop precisely locating the lefthand margin of the bezel 64 bordering the toggle 66 in the manner of FIG. 3 so as to fit into the openings provided in a combination trimplate (not shown). Obviously, by working from right to left and rotating the tool 180o without turning it over, the toggle 14 could be positioned to the left of the dual receptacle 12. It will be noted that in the application shown in FIG. 4, the long prong-forming screws 50 will have, once again, been used to attach the tool to the dual receptacle.

50 are stored and replaced by shorter screws 30, the tool fits conveniently in the pocket while all of the various functions it is capable of performing remain readily available. Thus, as a multipurpose combination spirit level and template, it has no counterpart.

I claim:

1. An electrician's tool which comprises: a rectangular housing having right and left sidewalls lying in spaced parallel relation to one another, top and bottom walls, a front face, a rear face, a stop-forming rib extending along the right sidewall projecting inwardly from the rear face, and a pair of prong-receiving openings located in the rear face spaced apart the distance separating the openings in a first grounded dual receptacle adapted to receive the grounded prongs of a wall plug; and means comprising a pair of prong-forming pins detachably connectable within the prong-receiving openings in the housing for insertion into the grounded prong-receiving openings in the first dual receptacle for holding said housing and receptacle in assembled relation, said pins when thus connected and inserted into the prong-receiving openings of said first dual receptacle cooperating with the rib spaced to the right thereof so as to position a second dual receptacle placed alongside the first and in stop-forming contact with said rib thereby positioning the plug-receiving parts of both dual receptacles in position to register with the openings in a double dual receptacle trimplate.

2. The electrician's tool as set forth in claim 1 in which: when said prong-forming pins are connected into their prong-receiving openings in the housing and into the prong-receiving openings in the first dual receptacle they are thus positioned relative to said rib and to a toggle switch in stop-forming contact with the latter to position both the plug-receiving parts of said dual receptacle and the bezel surrounding the toggle of said toggle switch so as to receive the openings in a combination dual receptacle and toggle switch trimplate placed thereagainst.

3. The electrician's tool as set forth in claim 1 in which: the housing includes a first window; and, in which a first bubble-type spirit level is fastened within said housing visible within said first window, said first spirit level providing a visual indication of when said dual receptacles are vertically aligned.

4. The electrician's tool as set forth in claim 1 in which: an insert in the form of a permanent magnet is mounted flush within at least one of said right and left sidewalls.

5. The electrician's tool as set forth in claim 1 in which: the housing is provided with prong-receiving passages for storing the prong-forming pins when not in use.

6. The electrician's tool as set forth in claim 1 in which: the sidewalls cooperate with the top and bottom walls of the housing to define a template defining the cutout to be made in a wall to receive an electrical box.

7. The electrician's tool as set forth in claim 1 in which: the housing includes a rectangular aperture sized to receive the bezel surrounding the toggle of a first toggle switch when the front face of said housing is placed thereagainst, said aperture when so positioned being spaced and oriented relative to the right sidewall of said housing such that the latter defines a stop positioned and adapted to locate a second toggle switch alongside the first in position such that both the bezels lie in proper position to register with the openings therefor in a dual toggle trimplate.

8. The electrician's tool as set forth in claim 3 in which: the housing includes a second window; and, in which a second bubble-type spirit level is mounted within the housing visible through said second window, said second spirit level providing a visual indication when said dual receptacles are horizontally aligned.

9. The electrician's tool as set forth in claim 8 in which: a third window is provided in the right sidewall opening onto the second bubble-type spirit level.

* * * * *